(12) United States Patent
Chen

(10) Patent No.: US 7,509,848 B2
(45) Date of Patent: Mar. 31, 2009

(54) PRESSURE GAGE SENSOR ADJUSTMENT DEVICE

(76) Inventor: Li-Chen Chen, 8F, No. 27, Lane 45, Dongyong St., Bade City, Taoyuan County 334 (TW)

(*) Notice: Subject to any disclaimer, the term of this patent is extended or adjusted under 35 U.S.C. 154(b) by 15 days.

(21) Appl. No.: 11/758,453

(22) Filed: Jun. 5, 2007

(65) Prior Publication Data

US 2007/0295092 A1    Dec. 27, 2007

(30) Foreign Application Priority Data

Jun. 7, 2006    (TW)    ............... 95209885 U

(51) Int. Cl.
*G01M 17/02* (2006.01)
*G01L 7/04* (2006.01)

(52) U.S. Cl. .......................... 73/146; 73/732
(58) Field of Classification Search ........... 73/732–743, 73/700–756; 361/283.1–283.4
See application file for complete search history.

(56) References Cited

U.S. PATENT DOCUMENTS

| | | | | |
|---|---|---|---|---|
| 4,906,977 A | * | 3/1990 | Huey-Jeng | .................. 340/626 |
| 5,469,137 A | * | 11/1995 | Muto | .......................... 340/462 |
| 5,533,414 A | * | 7/1996 | Huang | ........................ 73/866.1 |
| 5,895,861 A | * | 4/1999 | Slonaker | ....................... 73/732 |
| 6,636,155 B2 | * | 10/2003 | Elizondo-Salinas | ...... 340/815.4 |
| 6,684,712 B2 | * | 2/2004 | Klein et al. | .................... 73/732 |
| 6,742,396 B2 | * | 6/2004 | Schenk, Jr. | ................... 73/735 |

FOREIGN PATENT DOCUMENTS

JP    2000199718 A    *    7/2000

* cited by examiner

*Primary Examiner*—Andre J Allen
*Assistant Examiner*—Jermaine Jenkins

(57) ABSTRACT

A sensor adjustment device for an indicating pressure gauge includes a groove disposed on a dial and a sliding member. The sensor moves and is located in the groove by means of the sliding member. The gauge contains a sensor that operates without contacting an indicator needle of the gauge, and electronic signals are outputted from the sensor to automatically send an alarm once the indicator needle passes through where the sensor is located.

5 Claims, 6 Drawing Sheets

US 7,509,848 B2

PRESSURE GAGE SENSOR ADJUSTMENT DEVICE

BACKGROUND OF THE INVENTION (a) Field of the Invention

The present invention is related to a sensor adjustment device in a pressure gauge, and more particularly, to one capable of mounting and adjusting position of the sensor in a groove provided in perimeter of a dial.

(b) Description of the Prior Art:

To avoid accident hazard, a sensor is usually disposed in a meter. The sensor disposed in a pressure gauge detects status of an indicator needle and automatically sends alarm to notify, control pressure or urge emergency measures when the pressure challenges pre-set level of pressure.

The Bourdon tube gauge operating on contact detection is found with the following defects:

1. The contact when engaged will trigger off sparks to invite oxidization to the contact after a prolonged use of the gauge. Oxidized contact contributes to poor contact and thus to compromise reliability of signal output, and the seriously oxidized contact may even get broken up and damaged; and 2. Sparks also prevent the Bourdon tube gauge from operating in shop area or any other place strictly fire prohibited to render application of the Bourdon tube gauge subject to an extremely great limitation.

SUMMARY OF THE INVENTION

The present invention is to provide a sensor adjustment device for a pressure gauge to move the sensor along a groove disposed to a dial of the pressure gauge and locate the sensor at where as applicable.

A groove is disposed to the dial at where roughly constituting an arc at equidistance to an axis of an indicator needle for adjusting location of the sensor relatively traveling in the groove by means of a sliding member. The sliding member contains a clamping piece to ride on an edge of the dial, and an extension tab provided at its terminal a hook. The extension tab stays flushed on a back of the dial while having the hook engaged with an opening disposed at the center of the dial to locate the sliding member at where appropriately on the dial.

The present invention discloses a simple construction of a sensor adjustment for a pressure gauge that allows easy production and assembly, lower production cost, convenient operation and high level of industrial utility to provide a safe and ideal non-contact type of detection and automatic notification in meeting practical needs.

DETAILED DESCRIPTION OF THE PREFERRED EMBODIMENTS

Figure 1:
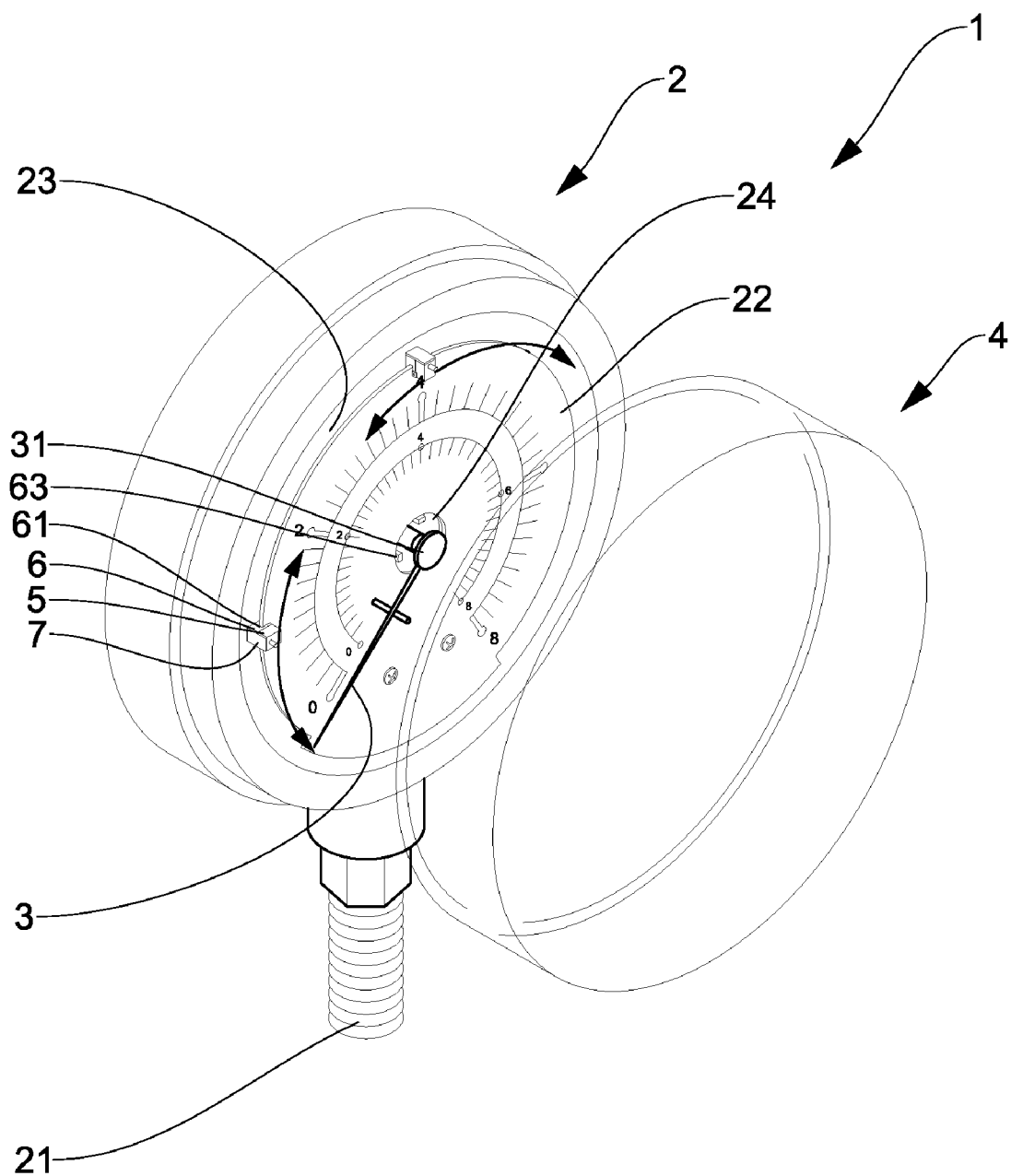
FIG. 1 is an exploded view of a local part of a preferred embodiment of the present invention.
Figure 2:
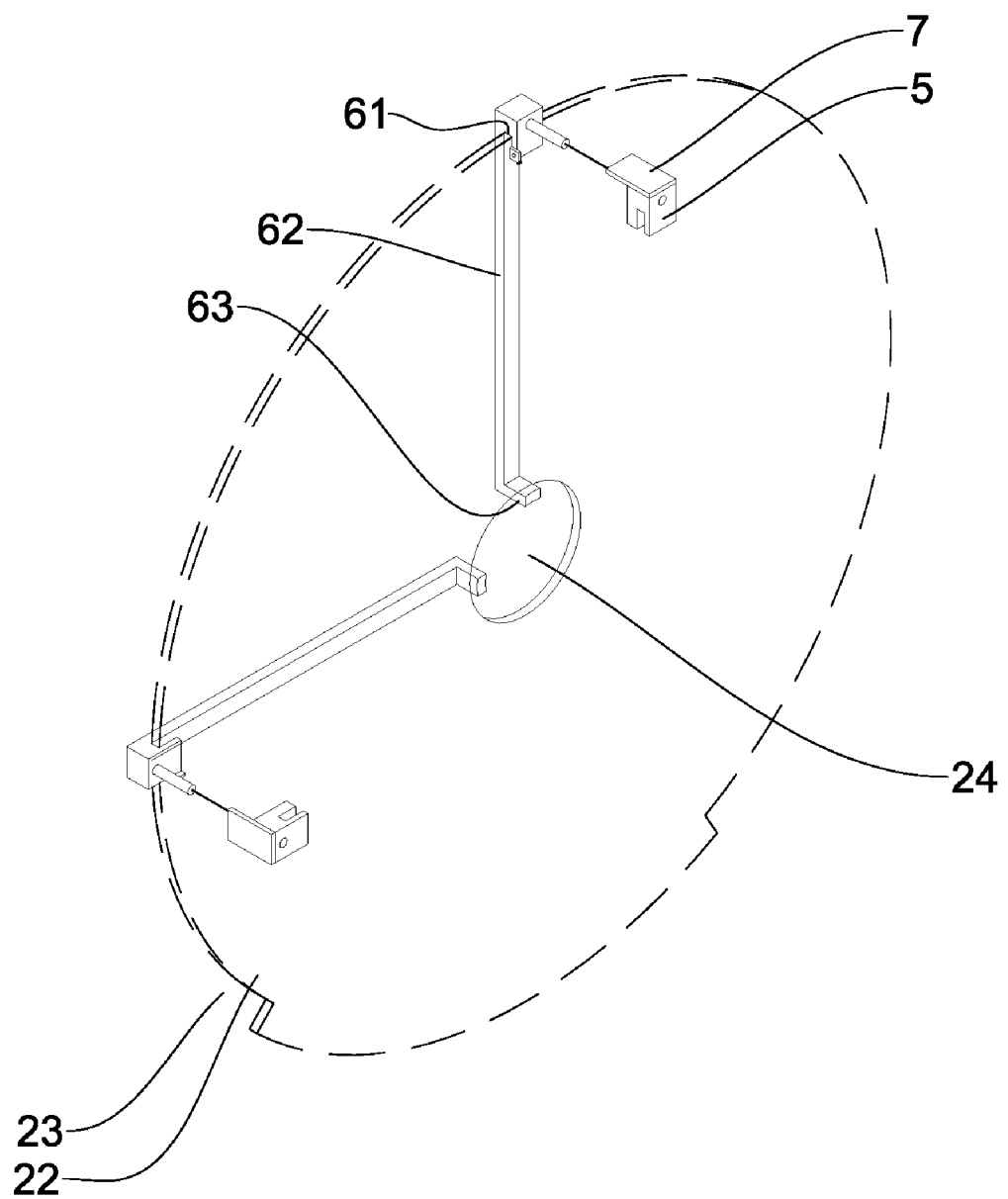
FIG. 2 is a perspective view showing an assembly of a dial, a sensor, and a sliding member of the preferred embodiment of the present invention.
Figure 3:
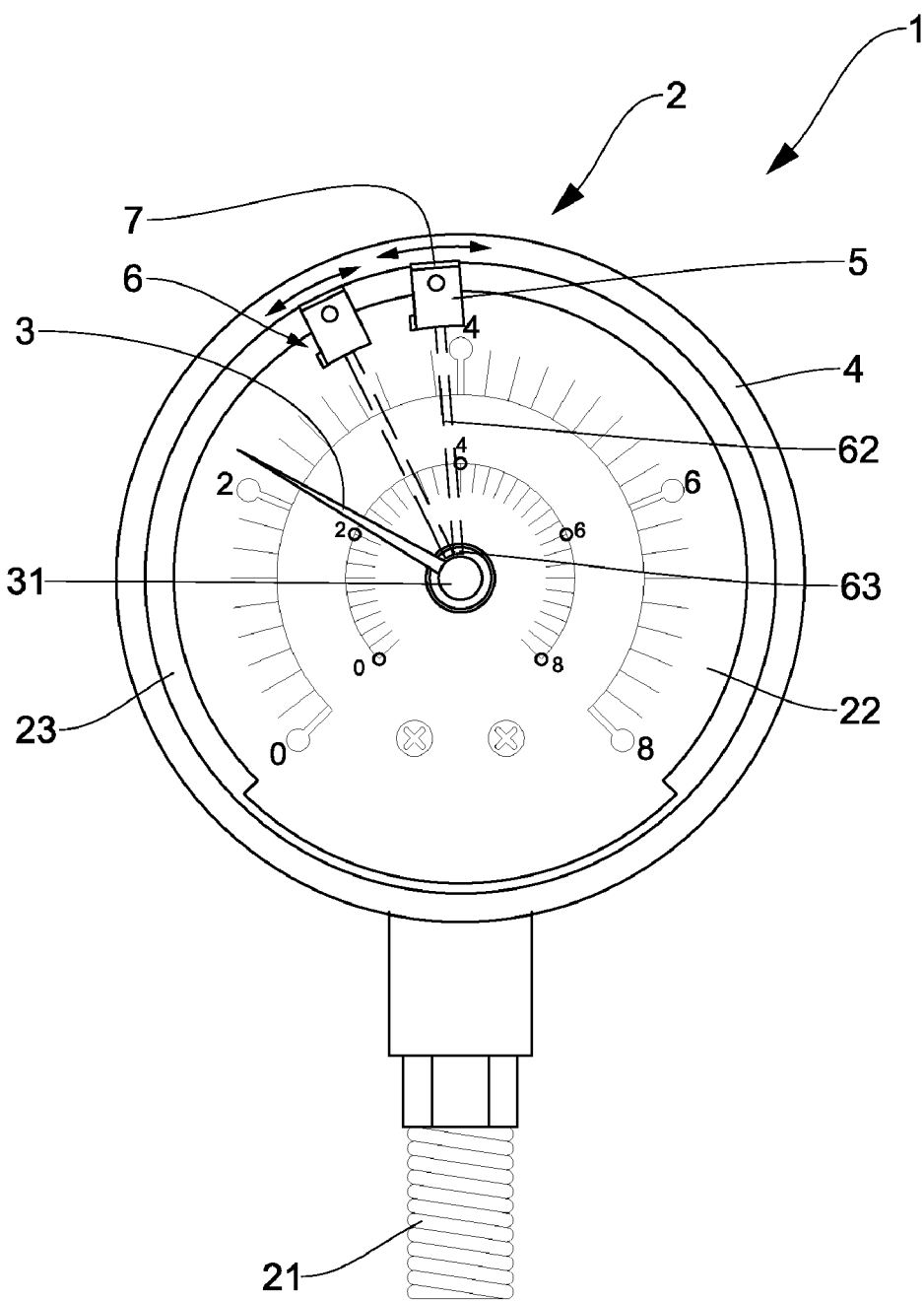
FIG. 3 is a front view showing an adjusting status of the preferred embodiment of the present invention.
Figure 4:
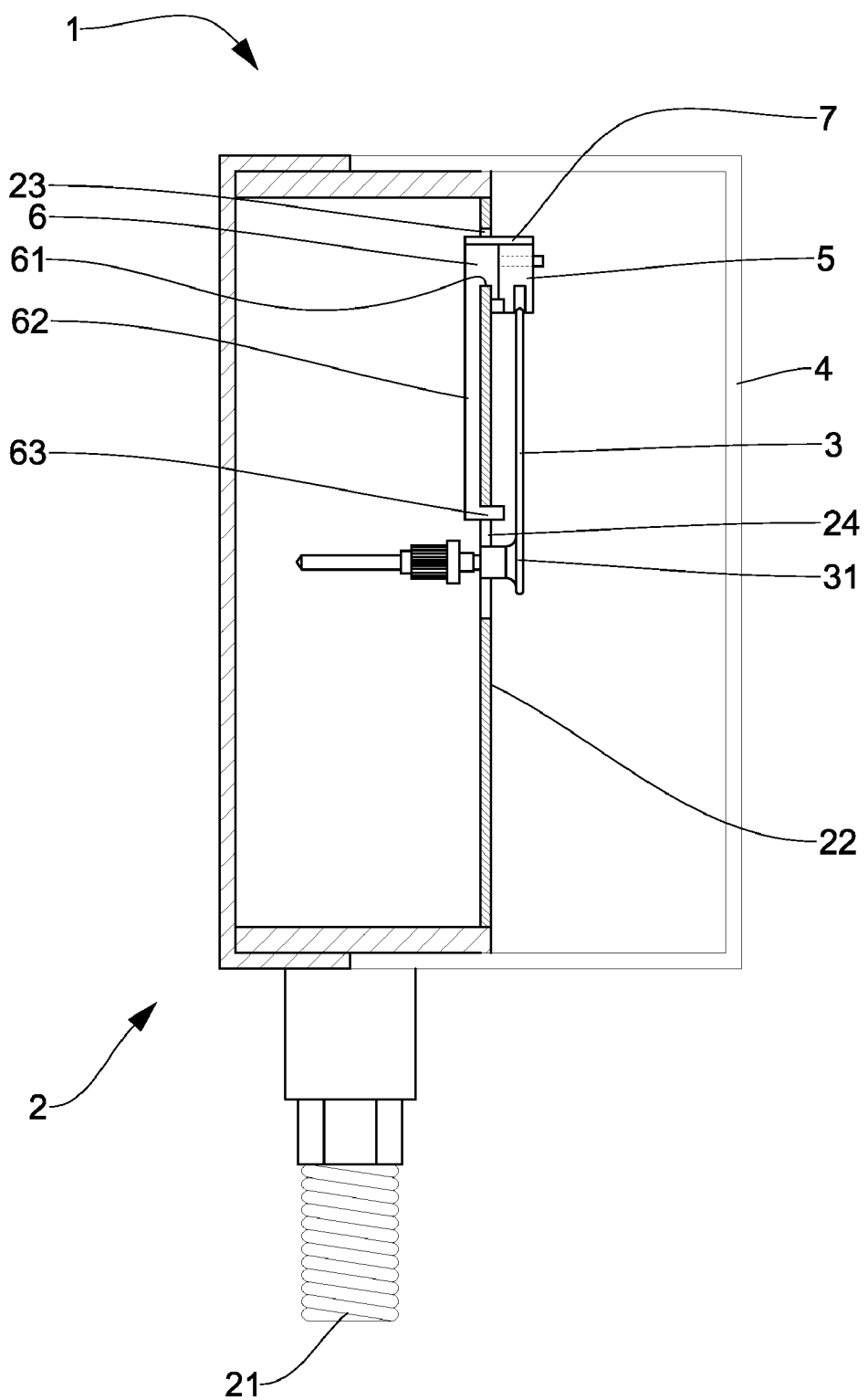
FIG. 4 is a sectional view of the preferred embodiment of the present invention.

Referring to FIGS. 1, 2, 3, and 5 for a preferred embodiment of the present invention, a sensor adjustment for a pressure gauge includes a pressure gauge 1 comprised of a body 2, an indicator needle 3, a front casing 4, a sensor 5, and a sliding member 6.

A connector 21 is provided at a lower end of the body 2; pressure is inputted through the connector 21 to be measured in the dial 2; a dial 22 roughly indicating an arc is disposed to an front edge of the body; a groove 23 is disposed at where appropriately on the dial 22; and an opening 24 is provided at a center of the dial 22.

The indicator needle 3 is disposed on the front edge of the body 2 through an axis 31 to tell on the dial a level of pressure measured in the body 2.

The front casing 4 preferred to be of a see-through material is disposed to the front edge of the body 2.

The sensor 5 for detecting status of the passing indicator needle 3 is adapted with the sliding member 6; the sliding member 6 riding on and traveling in the groove 23 includes a clamping piece 61 riding on an edge of the dial 22 and an extension tab 62 disposed at its terminal a hook 63. The extension tab 62 stays flushed on a back of the dial 22 and the hook 63 is engaged in the opening 24 located at the center of the dial 22 to properly locate the sliding member 6 in the groove 23. The sensor 5 is further adapted with a circuit board and electronic wiring connected to where inside the body 1.

Accordingly, to adjust a location of the sensor 5, the front casing 4 is removed from the body 2 to simply adjust the location of the sliding member 6 in relation to the groove 23. In practice, the adjustment is not frequently done making removal of the front casing 4 not a trouble at all.

Two sets with each comprising an indicator needle 3, a sensor 5, and a sliding member 5 may be disposed in the same pressure gauge 1. Each sensor 5 is assigned with a given zone and a safety zone on the dial 22 is defined at where between two given zones; so that when the indicator needle 3 points to where within the safety zone, it indicates normal pressure level; on the contrary, if the indicator needle 3 points to where outside its assigned zone, it indicates an abnormal pressure level, i.e., the pressure gets too low or too high as the case may be. Once the abnormal pressure level is detected, the sensor 5 automatically sends electronic signals in an audible and/or visible form through the circuit board 7 and its wiring to alert operator to take emergency measures.

Figure 5:
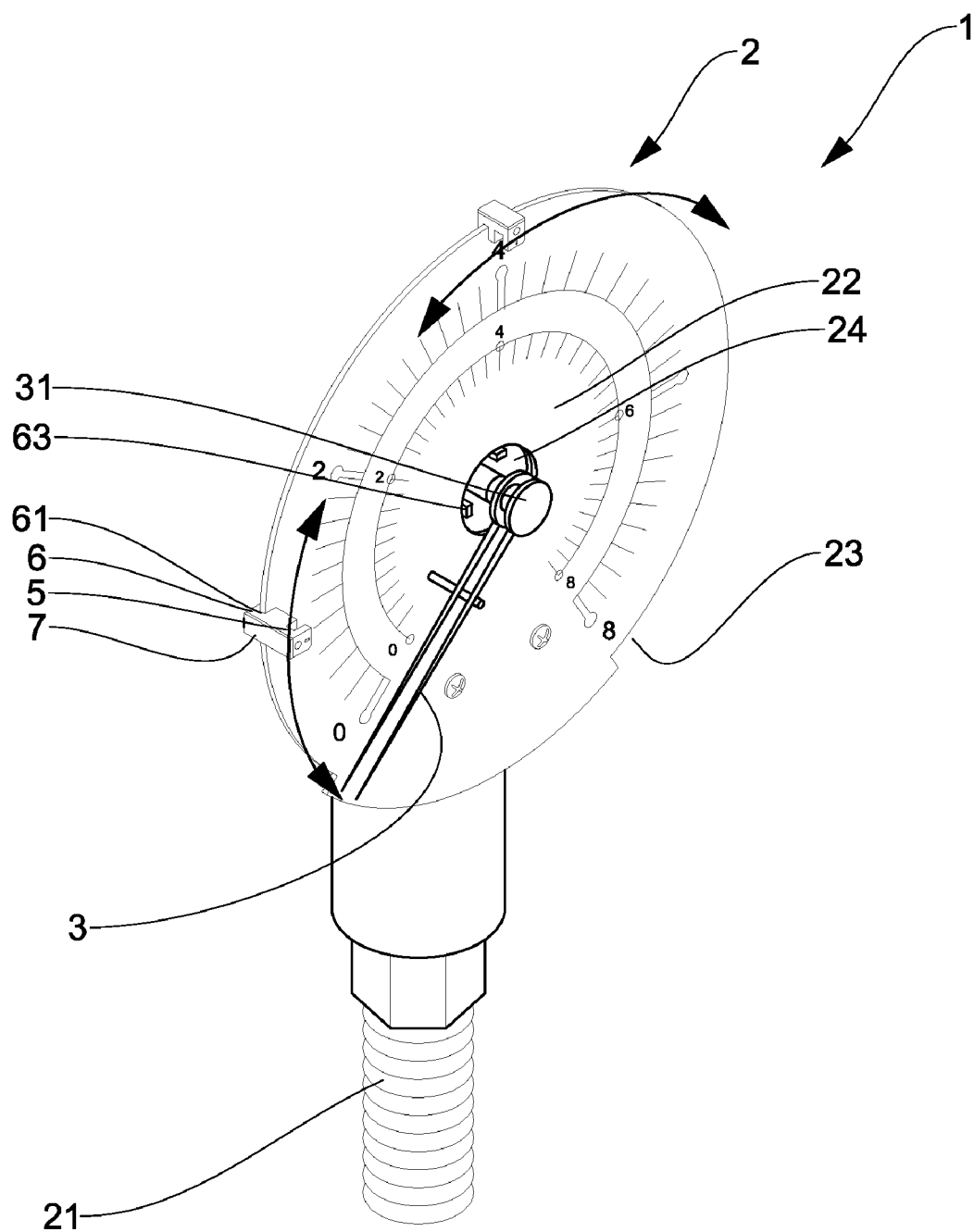
FIG. 5 is perspective view showing a local part of a second preferred embodiment of the present invention.
Figure 6:
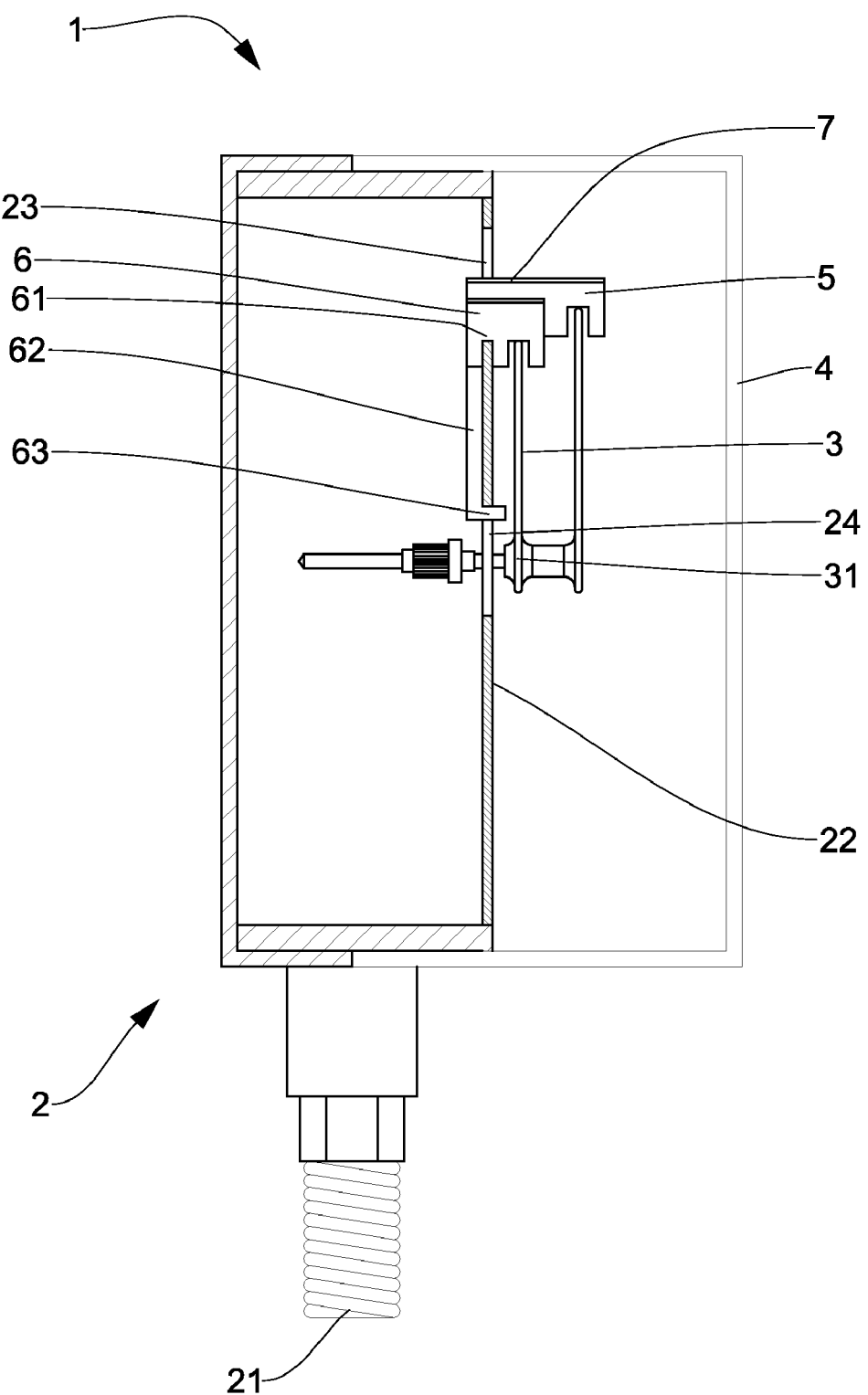
FIG. 6 is a sectional view showing the second preferred embodiment of the present invention.

Now referring to FIGS. 5 and 6 for another preferred embodiment of the present invention, two indicators 3 are overlapped in coping with detection by two sensors disposed at different levels.

In either preferred embodiment of the present invention, the sensor and the sliding member may be made in an integral part.

I claim:

1. A sensor adjustment device for a pressure gauge including a body adapted with a connector, a dial on an front edge of the body, an indicator needle on the dial through an axis of the dial, a groove on peripheral of the dial, and an opening at a center of the dial; and one or a plurality of sensors to detect status of the indicator needle, a sliding member connected to the sensor, the sliding member riding on and traveling in the groove; and the sliding member being provided with a clamping piece to engage edge of the dial, wherein an extension tab is disposed to the sliding member; a hook is provided to a terminal of the extension tab; the extension tab stays flushed on a back of the dial; and the hook engages in the central opening on the dial to locate the sliding member.

2. The sensor adjustment for a pressure gauge as claimed in claim 1, wherein the groove is made in an arc shape.

3. The sensor adjustment for a pressure gauge as claimed in claim 2, wherein the groove indicates equidistant relation with the axis of the indicator needle.

4. The sensor adjustment for a pressure gauge as claimed in claim 1, wherein the groove indicates equidistant relation with the axis of the indicator needle.

5. The sensor adjustment for a pressure gauge as claimed in claim 1, wherein a front casing made of a see-through material is provided to the front edge of the body.

* * * * *